United States Patent
Manchanda et al.

(10) Patent No.: US 11,785,271 B2
(45) Date of Patent: *Oct. 10, 2023

(54) SYSTEM AND METHOD FOR PERSONALIZED VIDEO CONTENT IN CONVERSATIONAL INTERFACE

(71) Applicant: Infosys Limited, Bangalore (IN)

(72) Inventors: Vishal Manchanda, Zirakpur (IN); Sowbarnika Sivasankaran, Chennai (IN); Pradeepraj Rajendran, Tiruvannamalai (IN); Sunil Gupta, Ambala (IN); Shazia Tasleem Bavalla, Telangana (IN); Guruprasad Nellitheertha Venkataraja, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 149 days.

This patent is subject to a terminal disclaimer.

(21) Appl. No.: 17/522,853

(22) Filed: Nov. 9, 2021

(65) Prior Publication Data

US 2022/0070515 A1      Mar. 3, 2022

Related U.S. Application Data

(63) Continuation-in-part of application No. 17/345,607, filed on Jun. 11, 2021, which is a continuation-in-part
(Continued)

(30) Foreign Application Priority Data

Dec. 17, 2019   (IN) ............................. 201941052391
Sep. 30, 2020   (IN) ............................. 202043042549

(51) Int. Cl.
*H04N 21/254*   (2011.01)
*G06F 16/78*   (2019.01)
(Continued)

(52) U.S. Cl.
CPC ......... *H04N 21/2542* (2013.01); *G06F 16/78* (2019.01); *G06Q 30/0271* (2013.01); *H04L 51/046* (2013.01)

(58) Field of Classification Search
CPC ......... H04N 21/2542; H04N 21/23412; H04N 21/4788; H04N 21/8146; G06F 16/78;
(Continued)

(56) References Cited

U.S. PATENT DOCUMENTS

| 2010/0023863 A1 | 1/2010 | Cohen-Martin |
| 2016/0212455 A1 | 7/2016 | Manna |

(Continued)

FOREIGN PATENT DOCUMENTS

| WO | 2006105480 A1 | 10/2006 |
| WO | 2007098260 A2 | 8/2007 |
| WO | 2015187048 A1 | 12/2015 |

OTHER PUBLICATIONS

Extended European Search Report, dated Mar. 1, 2022.
Extended European Search Report, EP Application No. 22160861.5, dated Sep. 2, 2022.

*Primary Examiner* — Anthony Bantamoi
(74) *Attorney, Agent, or Firm* — Troutman Pepper Hamilton Sanders LLP (Rochester)

(57) ABSTRACT

A method and/or system for dynamic generation of personalized video content in a conversational interface is disclosed. A chat application at a client device receives input from user which is communicated to chatbot platform. The chatbot platform composes a response in a data package and communicates to the chat application. If the format of the data package is of the type 'Personalized Smart Video', then a personalized video generation engine may generate a personalized video using a video template by displaying the video template and dynamically overlaying transformed user data on top of dedicated placeholders in the video (Continued)

template, thereby enhancing the user experience by rendering messages in form of personalized video at the client device and eliminating the need of creating a separate video file for each target user.

15 Claims, 6 Drawing Sheets

Related U.S. Application Data of application No. 16/809,295, filed on Mar. 4, 2020, now Pat. No. 11,166,061.

(51) Int. Cl.
*H04L 51/046* (2022.01)
*G06Q 30/0251* (2023.01)

(58) Field of Classification Search
CPC ............ G06F 16/735; G06F 16/90332; G06F 16/9535; G06Q 30/0271; H04L 51/046; H04L 51/02; H04L 51/10
See application file for complete search history.

(56) References Cited

U.S. PATENT DOCUMENTS

| | | |
|---|---|---|
| 2018/0376178 A1 | 12/2018 | Cormican |
| 2019/0311036 A1 | 10/2019 | Shanmugam |
| 2020/0234483 A1* | 7/2020 | Mashrabov ............ H04L 51/04 |

* cited by examiner

SYSTEM AND METHOD FOR PERSONALIZED VIDEO CONTENT IN CONVERSATIONAL INTERFACE

This application a continuation-in-part of U.S. patent application Ser. No. 17/345,607, filed Jun. 11, 2021, for System And Method For Dynamic Generation Of Charts In A Personalized Video, which claims priority to Indian Patent Application Serial No. 202043042549, Sep. 30, 2020, and is a continuation-in-part of application of U.S. patent application Ser. No. 16/809,295, filed Mar. 4, 2020, claiming priority of Indian Patent Application Serial No. 201941052391, filed Dec. 17, 2019, which are all hereby incorporated by reference in their entirety.

FIELD

The present technique relates to generation of a personalized video content. More specifically, the technique relates to dynamic generation of personalized video content in a conversational interface using web technologies.

BACKGROUND

Companies constantly look for providing distinctive experience for their customers by not only providing important information, but also emphasizing the relevance of that information. Making every communication count is one of the key differentiators in the field of customer experience. For example, in an insurance company, there may be multiple communication channels through which an insurer interacts with the customer; from sending out flyers and prospects to providing quotes, leads and statements. Often, the customer either fails to read the important information from these verbose documents or has difficulty in understanding them. These communication gaps lead to disengaged customers, which in turn may lead to repeated customer service interactions, and subsequently, a dissatisfied customer, and lower conversion rates.

In the past few years, videos are replacing the plain, boring, textual content online. It is generally in the form of mass marketing content, which is still less effective, as it lacks personalization. Customers still need to go through information to filter out and understand what is relevant to them and what is not. Customers thus have begun to expect communication that is tailored to their needs, instead of mass marketing.

One of the approaches to deliver personalized video experience is by creating one video per person. In this approach, content management is cumbersome, as every unique personalized video generated for each user needs to be stored in a database and hosted on server. The content also needs to be optimized for delivery across multiple devices and streamed thereof. This process is not very scalable. As the number of users increase so do the number of videos. Management of those videos and delivery become cumbersome over a period. It is also extremely expensive, considering production costs, storage costs, and delivery costs. The requirement of extensive setup for delivery of large volume of videos make the process cumbersome. Also, other personalized video offerings in market, the generation happens using server-side technologies, which would consume huge processing power and would need personal data to be passed to personalized video processing servers. All these costs more infrastructure, processing time, and effort. Passing on personal data to video processing servers brings responsibility for personalized video service providers to add security checks to protect data. Hence there is need to overcome the above-mentioned problem.

SUMMARY

Presently, most of the personalized video experience to the user is achieved by generating video for each person or the processing of the video is performed on servers, stored and the streamed to the user based on the user request which may consume more resources of servers and network. The present disclosure overcomes the above-mentioned problem using a single video template for a personalization campaign, by dynamically overlaying the personalization parameters on top of a video template in real-time using browser capabilities of the client device associated with the end user.

Disclosed are a system, a method and/or non-transitory computer readable storage medium for a dynamic generation of a personalized video content in a conversational interface through web technologies.

In one aspect, a computer implemented method for dynamic generation of a personalized video content is disclosed. The method comprising, receiving an input from a user though a conversational interface at a client device associated with the user. As a response to the user device, a data package is received from a conversation engine communicatively coupled to the client device over a computer network. The format of the data package received at the client device is identified. On determining that the format of the data package is of type 'Personalized Smart Video', a user data and information of the attributes of the personalized video content is extracted from the data package. The attributes of the personalized video content are received at the client device from a storage server, the attributes comprising at least one video template and a video configuration metadata file associated with the at least one video template. A personalized video content is displayed at the client device.

The step of displaying the personalized video content, comprises, appending the extracted user data to the video configuration metadata file to generate an updated video configuration metadata file. The updated video configuration metadata file may be parsed to generate one or more overlay elements. The at least one video template may comprise one or more placeholders. The one or more place holders may be populated with the one or more overlay elements. The personalized video content may be displayed by dynamically arranging the one or more overlay elements over the video template based on one or more predefined rules. The personalized video content may be displayed within the conversational interface or may be popped out from the conversational interface and played using browser embedded video player at the client device.

In another aspect, a system for dynamic generation of a personalized video content in a conversational interface is disclosed. The system comprising one or more components, but not limited to a client device capable of displaying a multi-media content wherein the client device is configured to receive an input from a user though a conversational interface at a client device associated with the user. As a response to the user device, a data package is received from a conversation engine communicatively coupled to the client device over a computer network. The format of the data package received at the client device is identified. On determining that the format of the data package is of type 'Personalized Smart Video', a user data and information of the attributes of the personalized video content is extracted from the data package. The attributes of the personalized video content are received at the client device from a storage server, the attributes comprising at least one video template and a video configuration metadata file associated with the at least one video template. A personalized video content is displayed at the client device.

The step of displaying the personalized video content, comprises, appending the extracted user data to the video configuration metadata file to generate an updated video configuration metadata file. The updated video configuration metadata file may be parsed to generate one or more overlay elements. The at least one video template may comprise one or more placeholders. The one or more place holders may be populated with the one or more overlay elements. The personalized video content may be displayed by dynamically arranging the one or more overlay elements over the video template based on one or more predefined rules. The personalized video content may be displayed within the conversational interface or may be popped out from the conversational interface and played using browser embedded video player at the client device.

In yet another aspect, a non-transitory computer readable storage medium for dynamic generation of a personalized video content in a conversational interface is disclosed. The non-transitory compute readable storage medium comprising machine executable code which when executed by at least one processor, causes the at least one processor to perform steps such as, receiving an input from a user though a conversational interface at a client device associated with the user. As a response to the user device, a data package is received from a conversation engine communicatively coupled to the client device over a computer network. The format of the data package received at the client device is identified. On determining that the format of the data package is of type 'Personalized Smart Video', a user data and information of the attributes of the personalized video content is extracted from the data package. The attributes of the personalized video content are received at the client device from a storage server, the attributes comprising at least one video template and a video configuration metadata file associated with the at least one video template. A personalized video content is displayed at the client device.

The step of displaying the personalized video content, comprises, appending the extracted user data to the video configuration metadata file to generate an updated video configuration metadata file. The updated video configuration metadata file may be parsed to generate one or more overlay elements. The at least one video template may comprise one or more placeholders. The one or more place holders may be populated with the one or more overlay elements. The personalized video content may be displayed by dynamically arranging the one or more overlay elements over the video template based on one or more predefined rules. The personalized video content may be displayed within the conversational interface or may be popped out from the conversational interface and played using browser embedded video player at the client device.

The method, the system, and/or the non-transitory computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

One of the exemplary objectives of examples of this technology is to overcome the technical problem mentioned in the background section through a system for dynamic generation of a personalized video content in a conversational interface using web technologies.

In one or more embodiments, a method, system and/or computer readable storage medium for dynamic generation of a personalized video content in a conversational interface using web technologies. The method comprising, receiving an input from a user though a conversational interface at a client device associated with the user. As a response to the user device, a data package is received from a conversation engine communicatively coupled to the client device over a computer network. The format of the data package received at the client device is identified. On determining that the format of the data package is of type 'Personalized Smart Video', a user data and information of the attributes of the personalized video content is extracted from the data package. The attributes of the personalized video content are received at the client device from a storage server, the attributes comprising at least one video template and a video configuration metadata file associated with the at least one video template. A personalized video content is displayed at the client device.

The step of displaying the personalized video content, comprises, appending the extracted user data to the video configuration metadata file to generate an updated video configuration metadata file. The updated video configuration metadata file may be parsed to generate one or more overlay elements. The at least one video template may comprise one or more placeholders. The one or more place holders may be populated with the one or more overlay elements. The personalized video content may be displayed by dynamically arranging the one or more overlay elements over the video template based on one or more predefined rules. The personalized video content may be displayed within the conversational interface or may be popped out from the conversational interface and played using browser embedded video player at the client device.

Figure 1:
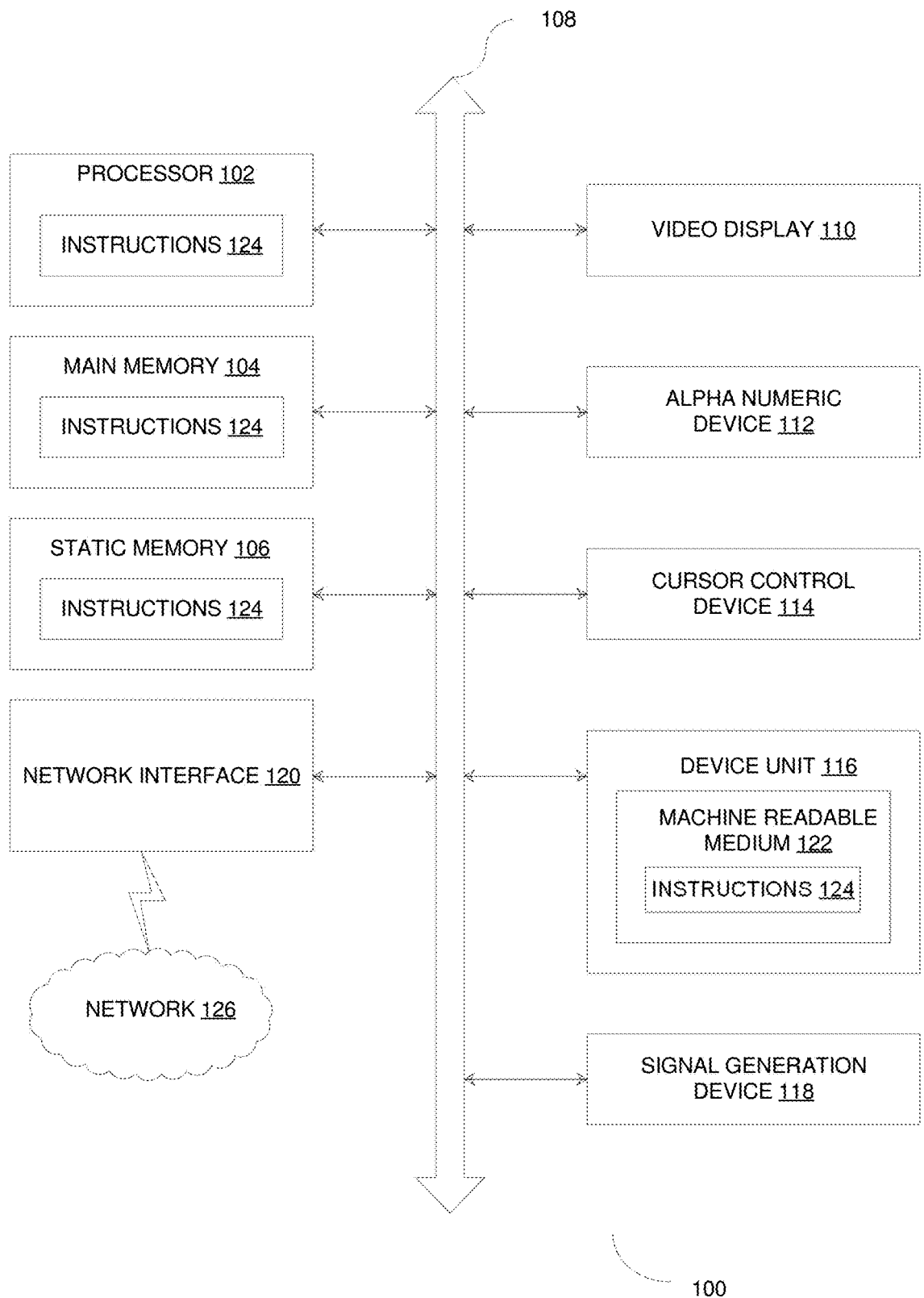
FIG. 1 is a diagrammatic representation of a data processing system capable of processing a set of instructions to perform any one or more of the methodologies herein, according to one or more embodiments.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media and magnetic media.

Figure 2A:
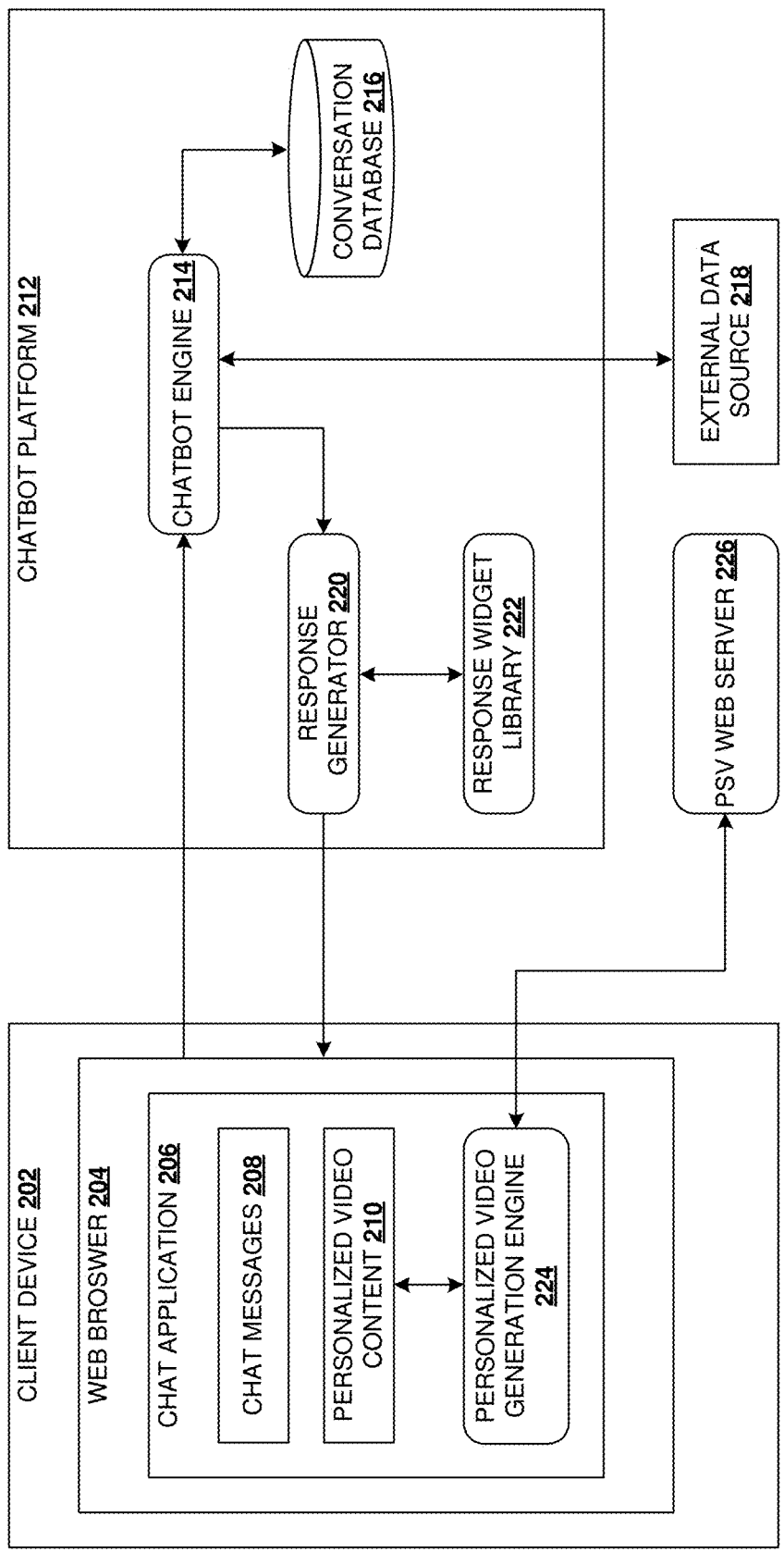
FIG. 2A is an architecture diagram illustrating a client device and associated components in a system for dynamic generation of personalized video content in a conversational interface, according to one or more embodiments.

FIG. 2A is an architecture diagram illustrating a client device and associated components in a system for dynamic generation of personalized video content in a conversational interface, according to one or more embodiments. In one or more embodiments. the system for generation of personalized video content in conversational interface may comprise client device 202 communicatively coupled to a chatbot platform 212 over a computer network. The client device 202 may be at least one of, but not limited to personal computer, a personal handheld device like smartphones and/or personal digital assistant (PDA) which can display digital multimedia contents. A web browser 204 installed at the client device 202 may be capable of displaying a chat application 206 (also referred as 'conversational interface') configured to display one or more chat messages 208 and/or personalized video content 210 (also referred as 'personalized video message' or 'personalized video'). Along with the above-mentioned components, the client device may comprise a personalized video generation engine 224 configured to dynamically generate personalized video content 210 using capabilities of the web browser 204. The personalized video generation engine 224 may be communicatively coupled to the PSV web server 226 ('PSV' stands for Personalized Smart Video) over a computer network, which is described in detail in subsequent paragraphs. The client device 202 may comprise network interface component which enables users to connect to chatbot platform 212 and/or PSV web server 226 through a computer network. The client device 202 may be configured to display digital multimedia contents through either a web browser 204 or through a chat application 206 or any other application capable of displaying the digital multimedia contents at the client device 202.

In one or more embodiments, the web browser 204 may comprise a browser embedded video player and may further be capable of executing one or more instructions of JavaScript or any such programming language supported by the web browser 204. The browser embedded video player may be configured to display digital multimedia content such as video and/or audio files of any format that are well known in the domain of digital content. The web browser 204 may use one or more network protocols such as, but not limited to Transmission Control Protocol (TCP), Internet Protocols (IP), File Transfer Protocol (FTP) and/or Hyper Text Transfer Protocol (HTTP) to communicate with other components over a computer network. The web browser 204 may be configured to run the chat application 206 at the client device 202. The chat application 206 may be configured to receive inputs from users and provide response in a format based on the determined intent of inputs received from the users. The format of the response may be of type, but not limited to simple text (chat messages 208), menu-based selection, buttons, images, editable forms, videos and/or 'Personalized Smart Video' (or personalized video content 210). The chat application 204 may be configured to display/play a video content within application window using a PSV player component associated with the chat application 204 or may send instructions to the web browser 204 to display/play the personalized video content. The PSV player component may be a multi-media player capable of rendering the personalized video content or any multi-media content at the client device 202. In one or more embodiments, the client device 202 may comprise personalized video generation engine 224 which is described in detail in subsequent paragraphs.

In one or more embodiments, the chatbot platform 212 may comprise one or more components but not limited to a chatbot engine 214, a conversation database 216, a response generator 220 and/or a response widget library 222. The chatbot engine 214 (also referred as 'conversation engine')

may be communicatively coupled to the conversation database 216, the external data source 218 and the response generator 220. The response generator 220 may be configured to communicate with response widget library 222.

The chatbot platform 212 may be configured to receive user inputs (also referred as 'user utterances') from the client device 202 through the chat application 206, compose responses and send it to the client device 202. The chatbot engine 214 may be configured to interpret user utterances using Natural Language Processing and determine the relevant response to the received user utterances. The chatbot engine 214 may determine the response based on configuration of the chat application 206, conversation context of the user utterances fetched from the conversation database 216 and/or user data fetched from the external data store 218. The conversation database 216 may be configured to store previous conversation data of the user and context associated with previous conversation data as a part of user interaction with chat application 206.

The external data source 218 may be configured to store information (also referred as 'user data') associated with the user. The external data source 218 may comprise various types of information provided by the user (e.g., demographics data, personal information, geo-location data etc.) and associated with a specific entity that user is associated with (e.g. car insurance, bill statements, customized information for user). The entities may comprise information which is personalized for the user. For example, the user may hold a Health Insurance account and the external data source 218 may contain information such as plan chosen by the user, premium amount, coverage etc. In other examples, the external data source 218 may include information from third-party sources such as, but not limited to, credit card companies, banks, social networking websites and/or email services. The user profile may be a part of external data source 218 and may be configurable by the user via a network application (e.g., a web page), which may comprise preferences of the user on what information and how such information to be communicated to the user. The chatbot engine 214 may be configured to access user data from the external data source 218 only when such requirement is identified based on the intent of user utterances. For example, the user may ask the chat application 206 to show meeting scheduled for next two days. The chatbot engine 214 may determine the intent from the user utterance that response should be the calendar details and may fetch the calendar details from the external data source 218. Another example wherein the user may request the chat application to show the savings account balance in which case the savings account details may be fetched from external data source 218.

In one or more embodiments, the user data may comprise confidential information based on the pre-defined attributes associated with the user data. In some cases, the user may choose to set the user data or part of user data to be confidential, by selecting attributes associated with the user data. For example, account number, mail ID and/or credit card number of the user may be 'confidential'. Also, the user may mark the account balance information as 'confidential'. In cases where the user data is marked as 'confidential' and such user data to be presented in a personalized video, the user may be authenticated before extracting the user data from the user data sources. The user may be authenticated by prompting user to enter the user ID, password or any credentials at the client device or through the chat application 206 to authenticate the user which ensures that the personalized video which may sometime comprise confidential information or any such tailored information is accessed by the intended user only. The user data for example, in case of utility bills for a user may be, but not limited to person name, bill amount, due date and/or reward points. In another example, for an auto insurance offer, the user data may be, but not limited to, purchaser name, purchased vehicle make, vehicle model and/or premium amount.

In one or more embodiments, the user data of a user may be extracted by the client device 202 encoded in the form of Uniform Resource Locator (URL) received as query parameters or relative URLs from the chatbot engine 214. In such cases, the user data may be extracted from the URLs or any webpage associated with the URLs and such data may be extracted by parsing the webpage.

The chatbot engine 214 may be configured to save each conversation data in the conversation database 216. The chatbot engine 214 may also be responsible to update user data stored in the external data source 218 when such requests are received from the user though chat application 206. The chatbot engine 214 may be configured to send the determined response i.e., intent that is determined for the user input and user data received from the external data source 218 (whenever required based on the determined intent) to the response generator 220. The response generator 220 may be configured to interpret the response received from the chatbot engine 214 and may determine a format in which the response to be communicated to the user with the help of the response widget library 222. The response widget library 222 may be configured to store collection of response widgets which comprises configuration information of all UI (user interface) elements that may be presented as a response/message to the user at the chat application 206. The response/message may be of type, but not limited to, text, buttons, editable forms, images, audios, videos and/or 'Personalized Smart Video' (personalized video content). The response generator 220 may be configured to select one widget from the response widget library 222, populate the widget with response received from the chatbot engine 214 and compose a data package. The composed data package may be sent to the chat application 206.

In one or more embodiments, the chat application 206 may be configured to identify the format of the data package. If the format of the data package may be any of text, buttons, editable forms, images, audios and/or videos, then the response may be processed by the chat application 206 as per the configuration and the message may be displayed to the user.

In one or more embodiments, if the format of the response is of type 'Personalized Smart Video', the chat application 206 may be configured to extract the user data and information of attributes of the personalized video content from the data package and send it to the personalized video generation engine 224. It is to be noted that if the widget selected by the response generator 220 while composing the data package is of the type PSV, then the selected widget may comprise information related to attributes of the personalized video content. The information of the attributes of the personalized video content may comprise information such as, but not limited to, user preferences for personalized video and/or storage location information (storage path) of a video template and associated video configuration metadata file stored in the PSV web server 226 (also referred as 'storage server').

The personalized video generation engine 224 may fetch the video template and associated video configuration metadata file from PSV web server 226 and generate a personalized video content (personalized video message 210) dynamically using the video template and the user data. The personalized video content 210 (or personalized video message 210) may be displayed within the chat application 206 at the client device 202.

Figure 2B:
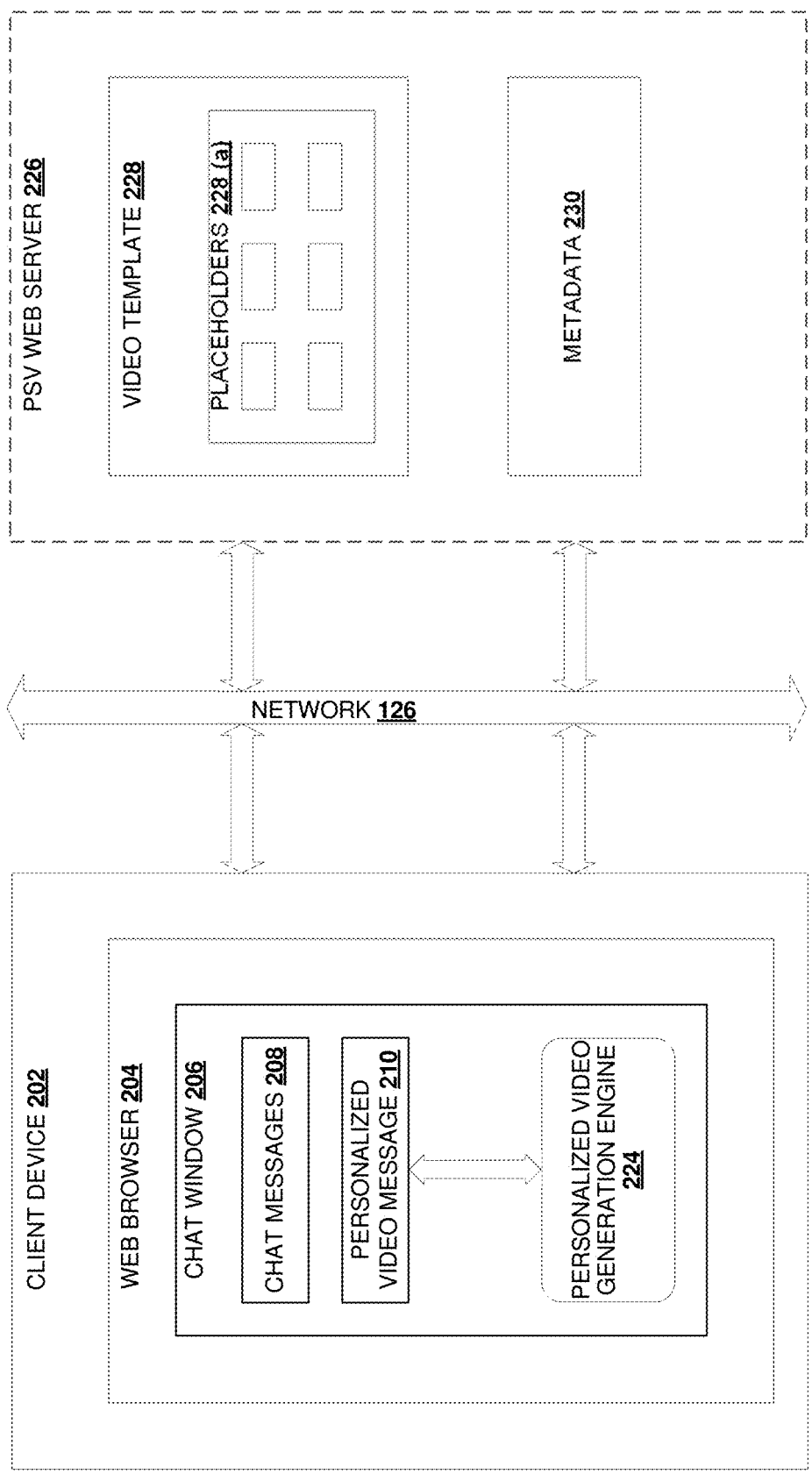
FIG. 2B is an architecture diagram illustrating components involved in generation of personalized video content, according to one or more embodiments.

FIG. 2B is an architecture diagram illustrating components involved in generation of personalized video content, according to one or more embodiments. In one or more embodiments, the PSV web server 226 may be configured to store a video template 228 and video configuration metadata 230 (also referred as metadata 230 or vide configuration metadata file 230) associated with one or more video templates. The storage of video template is not just limited to one, but plurality of templates. One of such plurality of templates may be selected to generate a personalized video based on user preferences. It is to be noted that the storage path may point to one video from plurality of video templates and in such instances the path of that one video template may be used generating personalized video content at the client device 202. In another instance wherein the storage path shared by the response generator 220 points to the plurality of video templates, then at least one video template may be selected based on either user preference available with the client device 202 or multi-media content rendering capability of the client device 202.

The capability of the client device 202 may be in terms of hardware and/or software capability to display a video content seamlessly. The hardware capabilities of the client device may be such as, but not limited to processor capability, display resolution, graphical processing unit capacity and/or availability at the client device 202. The software capabilities of the client device 202 may be such as, but not limited to operating system installed on the client device 202, encoders and decoders for processing and playing a multimedia content and/or file format support.

In one or more embodiments, the personalized video generation engine 224 may be configured to receive at least one video template 228 from the plurality of video templates stored in the PSV web server 226 based on the storage path information received from the chat application 206. The metadata 230 associated with the at least one video template 228 may also be accessed from the PSV web server 226 based on the storage path information.

In one or more embodiments, the video template 228 may be a video file comprising one or more placeholder 228(a) in each frame of the video wherein the video file may be customized to meet the requirement based on one or more rules. The one or more placeholders 228(a) may be such layouts in terms of set of pixels in each frame of a video template 228, identified using timestamps, that temporarily takes the shape of data or information to be displayed to the user at the client device 202. The one or more placeholders 228(a) may also be of geometrical shapes in the video template, defined during the creation of video template 228. The one or more placeholders 228(a) may be populated with data of different format such as, but not limited to texts, hyperlinks, images, videos, graphical objects and animations. Along with the one or more placeholders 228(a), the video template 204 may also be associated with one or more multimedia objects such as, but not limited to images, video clips, audio files (soundtracks, narration), texts and/or animations. The video template 228 may include a theme or story related to the topic of interest of the user based on user preferences or profile data of the user. Each video template may be designed differently to offer various styles in the generation of a personalized video content.

In one or more embodiments, the metadata 230 (also referred as video configuration metadata 230) may comprise one or more customizable video configuration parameters such as, but not limited to, timestamps associated with the one or more placeholders 228(a), alignment, layout and position information of the one or more placeholders 228(a), and/or data type of information to be populated to the one or more placeholders 228(a), timing, styling, positioning, animation information of annotations such as entry and exit animations to be shown in the video. The one or more placeholders 228(a) may be same across multiples frame of the video, may be different between each frame of the video, or may be spread across more than one frames of the video template 228.

For example, if a text to be overlaid on the one or more place holders 228(a), the metadata 230 may comprise video configuration parameters such as, but not limited to, font size, font style, colour, animation and/or opacity of the text. The PSV web server 226 may be configured to store plurality video templates 228 and each of the plurality of video templates 228 may be associated with plurality of metadata 230.

Based on the user data and information of the attributes of the personalized video content which may comprise information such as, user preferences for personalized video and/or storage location information, the personalized video generation engine 224 may fetch a video template 228 and video configuration metadata file 230 from the PSV web server 226. The personalized video generation engine 224 may be configured to process metadata 230, video template 204, user data, to dynamically generate a personalized video content display either through the browser embedded video player of the web browser 204 or within the chat application 206 in real-time.

The personalized video generation engine 224 may be configured to process metadata 230. The metadata 230 may be parsed and the user data may be added/appended to the metadata 230 to generate an updated metadata. The updated metadata may be parsed to generate one or more overlay elements. The one or more placeholders 228(a) may be populated with the generated one or more overlay elements. The personalized video content 210 may be displayed by dynamically arranging the one or more overlay elements over the video template 228 based on one or more predefined rules. The personalized video content 210 may be displayed within the chat application 206 or may be popped out from the chat application 206 and played using browser embedded video player at the client device 202. The process involved in generating a personalized video content is explained with an example in subsequent paragraphs. The personalized video content 210 may be displayed at the client device using at least one of display drivers associated with the client device 202, plug-ins associated with the web browser 204, UI add-ons associated with the chat application 206 and/or dedicated Graphics Processing Unit (GPU) associated with the client device 202. The user may be provided with controls to play, pause and/or navigate the personalized video content 210. During the display of the personalized video content 210 at the client device 202, the user may select data displayed on the video which may cause at least one of, but not limited to, expanded information of the selected data, navigation to another personalized video which may be generated as discussed in various embodiments of the present disclosure. The personalized video content 210 may optionally be stored at the client device 202.

In one or more embodiments, the personalized video generation engine 224 may process the data and process all the frames of the personalized video content 210 together and then render the personalized video. In another embodiments, the components of the personalized video generation engine 224 may process data in synchronous manner wherein each frame of the video is generated and presented in real-time. For example, while first frame of the personalized video content 210 is being displayed at the client device 202, the personalized video generation engine 224 may process the second frame in real-time and display it after the first frame of the personalized video content 210. So, when one frame of the personalized video is rendered, another frame may be processed meantime.

Figure 3:
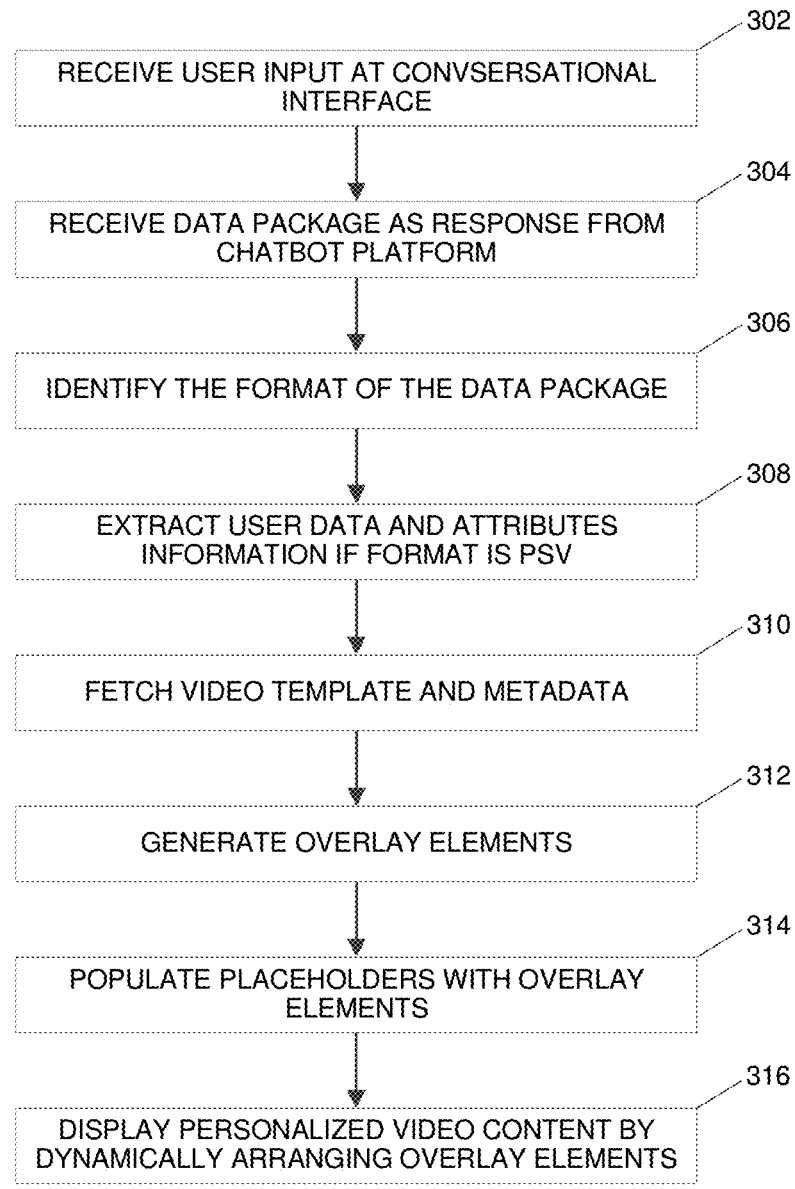
FIG. 3 is a process flow diagram illustrating steps performed at a client device for dynamic generation of personalized video content in a conversational interface, according to one or more embodiments.
Figure 4:
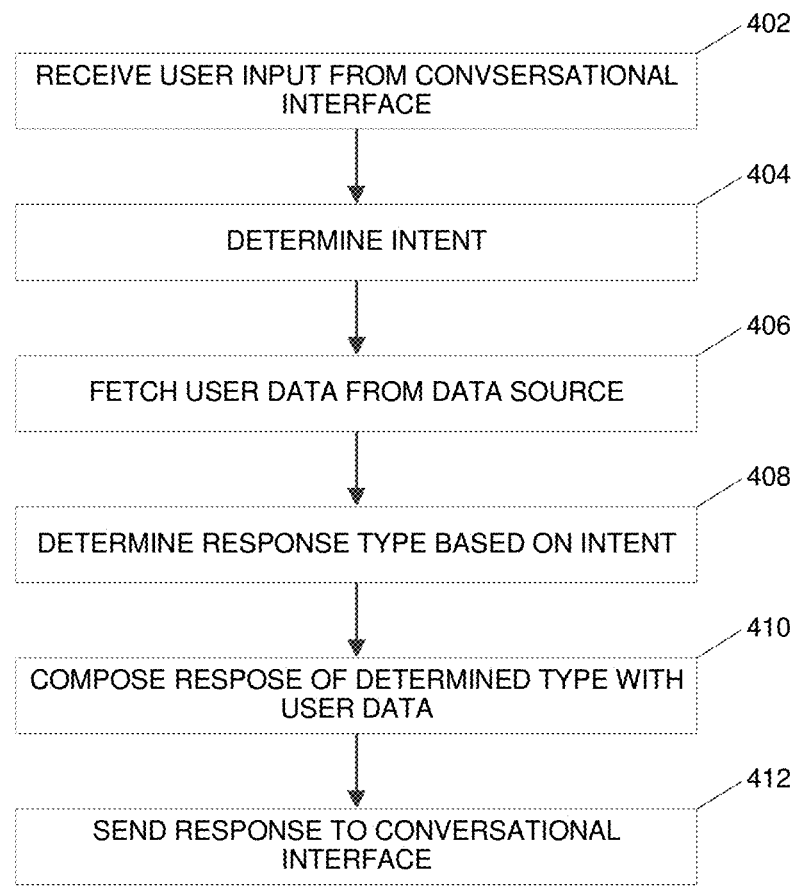
FIG. 4 is a process flow diagram illustrating steps performed at a chatbot platform for dynamic generation of personalized video content in a conversational interface, according to one or more embodiments.

FIG. 3 is a process flow diagram illustrating steps performed at a client device for dynamic generation of personalized video content in a conversational interface, according to one or more embodiments. In one or more embodiments, the user may initiate a conversation with the chat application (also referred as conversational interface). Also, in some instances, the conversational interface may trigger an event for user at the client device to initiate conversation, for example—calendar reminder, bill pay reminder etc. The user may provide input at the conversational interface associated with the client device, as in step 302. The user input may be communicated to the chatbot platform. The method executed by the chatbot platform is described with respect to FIG. 4 which is a process flow diagram illustrating steps performed at a chatbot platform for dynamic generation of personalized video content in a conversational interface, according to one or more embodiments. As illustrated in FIG. 4, the chatbot platform may be configured to receive user input from the conversational interface, as in step 402. The chatbot engine may determine intent of the received user input (also referred as user utterances) using Natural Language Processing (NLP) component configured/trained to determined intent, as in step 404. The chatbot engine may identify a response to be sent to the user based on the determined intent. The chatbot engine may fetch the response from either from conversation database or external data source or combination thereof, as in step 406. The chatbot engine may communicate with conversation database to determine and receive the response for the user input. The response obtained from the conversation database may be such data associated with the previous conversation of the user or the preconfigured responses stored at the conversation database as a part of configuration of the chatbot platform. The external data source may be a storage server configured to store user data which is such information that user requests at the conversational interface. The external data source may be domain-based data store, for example, financial, medical, insurance, social security etc. The chatbot engine may communicate the response received from the external data source and/or conversation database to the response generator. The response generator may determine response type (or format), as in step 408, based on the content present in the response received from the chatbot engine. The format of the response may be such as, but not limited to, image, action button, editable forms, text, video and/or personalized smart video. The format of the response may be determined based on at least one of but not limited to, the content of the response that needs to be delivered to the user, specific request made by the user as a part of user input and/or preferences of the user. The response generator may communicate with the response widget library and receive the response format configuration data. The response widget library may be configured to store one or more configurations for the responses for the format such as, but not limited to, image, action button, forms, text, video and/or personalized smart video. The configuration defines the UI elements which displays the response at the conversation interface. The response generator may append the response received from the chatbot engine with the configuration received from the widget library to compose data package of the determined format, as in step 410. The response generator may send the data package to the conversational interface, as in step 412.

In an example embodiment, consider a customer/user is looking for car insurance quotation (quote). The user may visit insurance provider website, interacts with the chat application. The chat application may ask whether user is looking for car insurance. When the user responds 'yes', the chat application may ask details such as—person name, car details (make, model, year etc.), address and desired coverage limits etc., either through a text format or an editable form format, as per the configuration at the chat application and chatbot platform. The chatbot platform may store inputs received from the user as pervious conversation and as context associated with previous conversation in the conversation database. Once required information to provide a quote is captured, this context is passed by chatbot engine to a backend services to get a quotation. Backend services may be such services responsible to provide domain specific response to user queries which is a car insurance company in the present example embodiment. The quote may be presented to the end user as a personalized video. In this case, the intent is—"getting car insurance quote". For each intent, responses may be configured as part of chatbot design/configuration. In this case, the response configured for successful quote generation may be a personalized video message. In case, some data is incomplete, or due to some reason quote is not available from the backend services, the response may be a text message.

Referring to FIG. 3, conversational interface may receive data package as a response from the chatbot platform, as in step 304. The conversational interface may identify the format of the data package, as in step 306. If the format is at least one of the type, image, action button, forms, text, and/or video, the content may be extracted from the data package and may be presented in the conversational interface using such UI elements as defined in the configuration data. If the format is of the type 'Personalized Smart Video', the conversation interface may extract user data and information of attributes of the personalized video content, as in step 308. The attributes may be such as, but not limited to a video template and/or the video configuration metadata associated with the video template. The information of the attributes of the personalized video content may comprise information such as, but not limited to, user preferences for personalized video and/or storage location information (storage path) where a video template and associated video configuration metadata is stored in the PSV web server. The information of the attributes may be communicated to personalized video generation engine which may be configured to generate personalized video content. The personalized video generation engine may fetch video template and the video configuration metadata, as in step 310. The personalized video generation engine may generate one or more overlay elements, as in step 312. The one or more overlay elements are the transformed user data that are to be presented in the form of personalized video which are overlaid on the video template during playback of the video template. The video configuration metadata may be updated with user data to generate overlay elements and the placeholders of the video template may be populated with overlay elements, as in step 314. Then, the personalized video content may be displayed within the conversational interface by dynamically arranging the overlay elements during the playback of the video template, as in step 316. Optionally, the personalized video content may be displayed outside the conversational interface using browser embedded video player associated with the web browser.

In an example embodiment, consider a case wherein a wellness reminder to be communicated to the user. The user may log-in to a healthcare portal which comprises a chat application. The user may respond to view the message. The chat application may capture user message (or input) and send it as user utterance to a chatbot platform. The chatbot platform comprises chatbot engine which may process the request from the user. The chatbot engine may interpret user message (utterance) and may identify user intent using NLP component. The chatbot engine may identify response based on the intent identified by NLP component. The chatbot engine may fetch user data from the external data source (which may be healthcare account management services) comprising username of the user, name of the contact persons and contact number of the persons. Based on the intent, the response may be identified to be personalized video message with user data such as username, several contact numbers of healthcare service and name of contact persons. The chatbot engine may send the identified response to response generator. The response generator may receive the response from chatbot engine and identifies the type of response widget. The response generator may fetch the configurations of the widget from response widget library, which will contain configurations for the response type 'Personalized Smart Video' (PSV). The response generator may compose a data package by appending the user data (username, contacts, and contact person name) to the response widget which comprises path to the video template and video configuration metadata. The composed data package may be sent to the chat application. The chat application on browser interprets the type of message to be PSV and invokes the personalized video generation engine.

The personalized video generation engine may fetch the video template and video configuration metadata from the PSV web server. The video template may be a wellness reminder template with placeholders to show username, contact person name and contact numbers. The user data may be appended to the video configuration metadata to create an updated video configuration metadata. The updated video configuration metadata may be parsed to create overlay elements which are nothing but transformed user data which suits the format of personalized video as per the configuration defined in the video configuration metadata. The one or more placeholders may be populated as per the association rules defined in the video configuration metadata. The personalized video generation engine may invoke a video player at run time using PSV player component. The PSV player component plays the video template and renders the personalized video message within the chat window of the chat application by dynamically arranging overlay elements on top of the respective placeholders in each frame of the video template.

Figure 5:
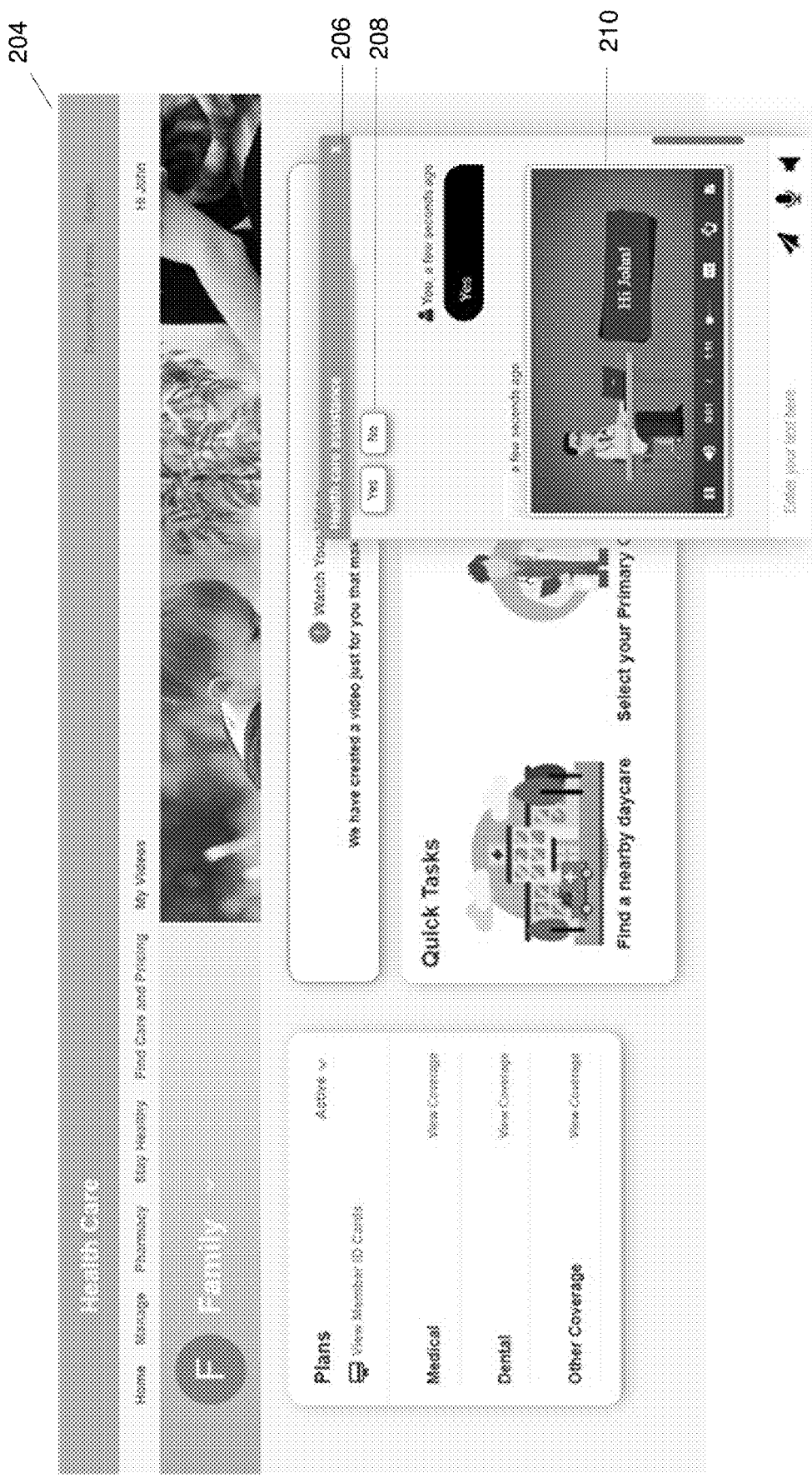
FIG. 5 is a screenshot illustrating a user interface at the client device delivering personalized video content within conversational interface, according to one or more embodiment.

FIG. 5 is a screenshot illustrating a user interface at the client device delivering personalized video content within conversational interface, according to one or more embodiment. The screenshot illustrates a web page in the web browser 204 which comprises multiple options to serve user of a health care portal. The web browser 204 may comprise chat application 206 which comprises chat messages 208.

The personalized video content 208 may also be delivered to the user within the chat application 206 generated through method and/or system for dynamic generation of personalized video content as described in various embodiments of the present disclosure.

In one or more embodiments, a non-transitory computer readable storage medium for dynamic generation of a personalized video content in a conversational interface using web technologies. The method comprising, receiving an input from a user though a conversational interface at a client device associated with the user. As a response to the user device, a data package is received from a conversation engine communicatively coupled to the client device over a computer network. The format of the data package received at the client device is identified. On determining that the format of the data package is of type 'Personalized Smart Video', a user data and information of the attributes of the personalized video content is extracted from the data package. The attributes of the personalized video content are received at the client device from a storage server, the attributes comprising at least one video template and a video configuration metadata file associated with the at least one video template. A personalized video content is displayed at the client device.

The step of displaying the personalized video content, comprises, appending the extracted user data to the video configuration metadata file to generate an updated video configuration metadata file. The updated video configuration metadata file may be parsed to generate one or more overlay elements. The at least one video template may comprise one or more placeholders. The one or more place holders may be populated with the one or more overlay elements. The personalized video content may be displayed by dynamically arranging the one or more overlay elements over the video template based on one or more predefined rules. The personalized video content may be displayed within the conversational interface or may be popped out from the conversational interface and played using browser embedded video player at the client device.

The personalized video may be used to communicate personalized information to a user in way by improving the presentation to the user. The advantage of the technology described in the present disclosure is that the overlay elements are not pre-processed or created at server side before being rendered on screen for the end user. Instead the overlay elements (information that needs to be communicated to the user) are overlaid in real-time on video using web technologies/browser capabilities available at the client device. The capabilities of the web technologies are harnessed to take personalized video watching experience to the next level. Instead of creating one video per person, the described technology reuses a single video template for a personalization campaign and overlay the personalization parameters on top of the video template using browser capabilities at the client device. The video file is not created but the video template is dynamically personalized in real-time based on user data. The disclosed technology may be used to deliver personalized communication in Business-to-Customer (B2C) scenarios for various stages of customer interactions (e.g. prospects, onboarding, reminders) in various domains without spending much on processing power and storage resources.

The specification and drawings in the present disclosure are to be regarded in an illustrative rather than a restrictive sense.

What is claimed is:

1. A computer implemented method for dynamic generation of personalized video content, the method comprising:
   receiving, at a client device, at least one input from a user through a conversational interface;
   receiving, at the client device, a data package from a conversation engine in response to the at least one user input;
   identifying, at the client device, a format of the data package; and
   in response to the identifying the format of the data package is a personalized smart video:
      extracting, at the client device, a user data and information of attributes of the personalized video content from the data package;
      receiving, at the client device, the attributes of the personalized video content from a storage server, the attributes comprising at least one video template and a video configuration metadata file; and
      displaying, at the client device, the personalized video content.

2. The computer implemented method of claim 1, wherein the displaying of the personalized video content, comprising:
   appending, at the client device, the extracted user data to the video configuration metadata file to generate an updated video configuration metadata file;
   parsing, at the client device, the updated video configuration metadata file to generate one or more overlay elements;
   populating, at the client device, one or more placeholders of the at least one video template with the one or more overlay elements; and
   displaying, at the client device, the personalized video content by dynamically arranging the one or more overlay elements over the video template based on one or more predetermined rules.

3. The computer implemented method of claim 1, wherein the personalized video content is displayed within the conversational interface.

4. The computer implemented method of claim 1, wherein the video configuration metadata file comprises one or more customizable configuration parameters.

5. The computer implemented method of claim 1, wherein the at least one video template is selected from plurality of video templates based on user preferences.

6. A system for dynamic generation of personalized video content, comprising:
   at least one processor; and
   at least one memory unit operatively coupled to the at least one processor, having instructions stored thereon that, when executed by the at least one processor, causes the at least one processor to:
   receive, at a client device, at least one input from a user through a conversational interface;
   receive, at the client device, a data package from a conversation engine in response to the at least one user input;
   identify, at the client device, a format of the data package; and
   in response to the identifying the format of the data package is a personalized smart video:
      extract, at the client device, a user data and information of attributes of the personalized video content from the data package;
      receive, at the client device, the attributes of the personalized video content from a storage server, the attributes comprising at least one video template and a video configuration metadata file; and
      display, at the client device, the personalized video content.

7. The system of claim 6, wherein the displaying of the personalized video content causes the at least one processor to:
   append, at the client device, the extracted user data to the video configuration metadata file to generate an updated video configuration metadata file;
   parse, at the client device, the updated video configuration metadata file to generate one or more overlay elements;
   populate, at the client device, one or more placeholders of the at least one video template with the one or more overlay elements; and
   display, at the client device, the personalized video content by dynamically arranging the one or more overlay elements over the video template based on one or more predetermined rules.

8. The system of claim 6, wherein the personalized video content is displayed within the conversational interface.

9. The system of claim 6, wherein the video configuration metadata file comprises one or more customizable configuration parameters.

10. The system of claim 6, wherein the at least one video template is selected from plurality of video templates based on user preferences.

11. A non-transitory computer readable medium having stored thereon instructions for dynamic generation of personalized video content, the non-transitory computer readable medium comprising machine executable code which when executed by at least one processor, causes the at least one processor to perform steps comprising:
    receiving, at a client device, at least one input from a user through a conversational interface;
    receiving, at the client device, a data package from a conversation engine in response to the at least one user input;
    identifying, at the client device, a format of the data package; and
    in response to the identifying the format of the data package is a personalized smart video:
       extracting, at the client device, a user data and information of attributes of the personalized video content from the data package;
       receiving, at the client device, the attributes of the personalized video content from a storage server, the attributes comprising at least one video template and a video configuration metadata file; and
       displaying, at the client device, the personalized video content.

12. The non-transitory computer readable medium of claim 11, wherein the displaying of the personalized video content, comprising:
    appending, at the client device, the extracted user data to the video configuration metadata file to generate an updated video configuration metadata file;
    parsing, at the client device, the updated video configuration metadata file to generate one or more overlay elements;
    populating, at the client device, one or more placeholders of the at least one video template with the one or more overlay elements; and
    displaying, at the client device, the personalized video content by dynamically arranging the one or more overlay elements over the video template based on one or more predetermined rules.

13. The non-transitory computer readable medium of claim 11, wherein the personalized video content is displayed within the conversational interface.

14. The non-transitory computer readable medium of claim 11, wherein the video configuration metadata file comprises one or more customizable configuration parameters.

15. The non-transitory computer readable medium of claim 11, wherein the at least one video template is selected from plurality of video templates based on user preferences.

* * * * *